US010473031B2

United States Patent
Ellsworth et al.

(10) Patent No.: US 10,473,031 B2
(45) Date of Patent: Nov. 12, 2019

(54) SYSTEMS AND METHODS FOR PREVENTING FUEL LEAKAGE IN A GAS TURBINE ENGINE

(71) Applicant: GENERAL ELECTRIC COMPANY, Schenectady, NY (US)

(72) Inventors: Richard Allen Ellsworth, Cincinnati, OH (US); Frederick Ehrwulf Van Alen, Cincinnati, OH (US); Thomas Vander Ng, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 395 days.

(21) Appl. No.: 14/396,459

(22) PCT Filed: Apr. 26, 2013

(86) PCT No.: PCT/US2013/038393
§ 371 (c)(1),
(2) Date: Oct. 23, 2014

(87) PCT Pub. No.: WO2014/014536
PCT Pub. Date: Jan. 23, 2014

(65) Prior Publication Data
US 2015/0089953 A1    Apr. 2, 2015

Related U.S. Application Data

(60) Provisional application No. 61/639,627, filed on Apr. 27, 2012.

(51) Int. Cl.
*F02C 7/22* (2006.01)
*F02C 7/232* (2006.01)

(52) U.S. Cl.
CPC .............. *F02C 7/222* (2013.01); *F02C 7/232* (2013.01); *F05D 2260/602* (2013.01); *Y02T 50/671* (2013.01)

(58) Field of Classification Search
CPC .............. F02C 7/22; F02C 7/222; F02C 7/232
See application file for complete search history.

(56) References Cited

U.S. PATENT DOCUMENTS 4,612,766 A    9/1986 Eder
5,528,897 A    6/1996 Halin
(Continued)

FOREIGN PATENT DOCUMENTS

| CN | 101008497 A | 8/2007 |
|---|---|---|
| JP | 60169000 A | 9/1985 |
| JP | 2005530951 A | 10/2005 |

OTHER PUBLICATIONS

Unofficial English translation of Chinese Office Action issued in connection with corresponding CN Application No. 20130021792.4 on Sep. 25, 2015.

(Continued)

*Primary Examiner* — Craig Kim
*Assistant Examiner* — Rene D Ford
(74) *Attorney, Agent, or Firm* — Dority & Manning, P.A.

(57) ABSTRACT

Systems and methods for preventing fuel leakage in a gas turbine engine are provided. A fuel accumulation system includes a control valve section fluidly coupled to a fuel manifold passage and an accumulator valve section fluidly coupled at a first side to the control valve section. The control valve section is configured to control expansion of a fluid flowing in the fuel manifold passage. The accumulator valve section is configured to receive fluid expanded in the fuel manifold passage via the control valve section.

18 Claims, 4 Drawing Sheets

(56) References Cited

U.S. PATENT DOCUMENTS

| | | |
|---|---|---|
| 5,809,771 A | 9/1998 | Wernberg |
| 6,751,939 B2 | 6/2004 | Futa, Jr. et al. |
| 7,131,274 B2 | 11/2006 | Baryshnikov et al. |
| 7,854,121 B2 | 12/2010 | Vandale et al. |
| 2003/0200754 A1 | 10/2003 | Futa, Jr. et al. |
| 2005/0011197 A1 | 1/2005 | Tuttle et al. |
| 2010/0132368 A1 | 6/2010 | Lawrence |

OTHER PUBLICATIONS

International Search Report and Written Opinion dated May 3, 2014 which was issued in connection with PCT Application No. PCT/US2013/038393 which was filed on Apr. 26, 2013.

Unofficial English Translation of Japanese Office Action issued in connection with corresponding JP Application No. 2015-509178 dated Jan. 5, 2016.

Unofficial English Translation of Japanese Notice of Allowance issued in connection with corresponding JP Application No. 2015-509178 dated Apr. 19, 2016.

SYSTEMS AND METHODS FOR PREVENTING FUEL LEAKAGE IN A GAS TURBINE ENGINE

CROSS REFERENCE TO RELATED APPLICATIONS

This application claims priority to U.S. Provisional Application No. 61/639,627 filed Apr. 27, 2012, which is hereby incorporated by reference in its entirety.

BACKGROUND

The field of the invention relates generally to fuel leakage prevention, and more particularly to a method and a fuel accumulator system for preventing fuel leakage in a gas turbine engine.

Aircraft turbofan engines produce a high amount of heat in order to meet a stringent requirement on fuel efficiency and pollutants. During shutdown of these engines, the engine heat flows to cooler sections of the engine, which may be referred to as soakback. Soakback can cause the fuel manifold, which is cooler than other parts of the engine, to increase in temperature. The fuel manifold is a closed system at engine shutdown, so as the temperature rises, fuel pressure increases because of bulk fuel expansion. If the pressure rises above the cracking pressure of the fuel nozzles, then the fuel will leak into the hot engine, causing fuel vapors to leak out of both the inlet and the exhaust of the engine. The vapors can affect aircraft certification and customer acceptance, as well as increase the costs associated with operating the engine.

Designing a ventilation system to enable the heat to escape typically requires long lead times and difficult integration with the engine, both of which increase costs of implementing ventilation systems. Accordingly, a system is needed for these engines that prevents pressure build-up in the fuel manifold, thereby preventing fuel from leaking into the engine.

BRIEF DESCRIPTION

In one aspect, a fuel accumulation system for a gas turbine engine is provided. The fuel accumulation system includes a control valve section fluidly coupled to a fuel manifold passage and an accumulator valve section fluidly coupled at a first side to the control valve section. The control valve section is configured to control expansion of a fluid flowing in the fuel manifold passage. The accumulator valve section is configured to receive fluid expanded in the fuel manifold passage via the control valve section.

In another aspect, a method of preventing fuel leakage in a gas turbine engine is provided. The method includes controlling expansion of a fluid flowing in a fuel manifold passage using a control valve section fluidly coupled to the fuel manifold passage and receiving fluid expanded in the fuel manifold passage via the control valve section at an accumulator valve section fluidly coupled to the control valve section.

In yet another aspect, a gas turbine engine is provided that includes a fuel split valve and a fuel accumulation system coupled to the fuel split valve. The fuel accumulation system includes a control valve section fluidly coupled to a fuel manifold passage and an accumulator valve section fluidly coupled at a first side to the control valve section. The control valve section is configured to control expansion of a fluid flowing in the fuel manifold passage. The accumulator valve section is configured to receive fluid expanded in the fuel manifold passage via the control valve section.

DETAILED DESCRIPTION

The following detailed description illustrates an accumulator system and a method of assembling the same by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, an accumulator and a method of assembling the same. However, it is contemplated that this disclosure has general application to accumulators in a broad range of systems and in a variety of industrial and/or consumer applications.

Figure 1:
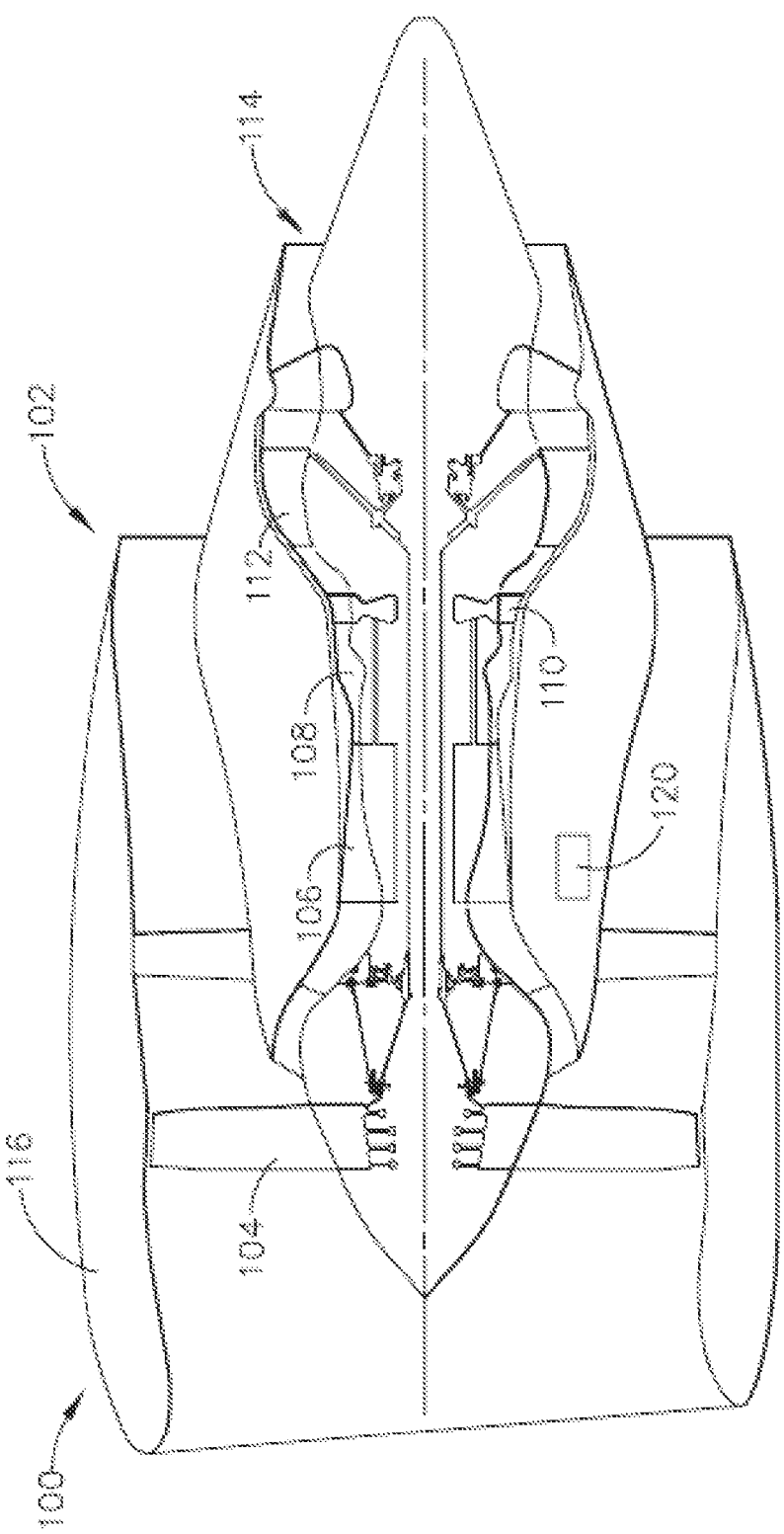
FIG. 1 is a schematic view of an exemplary core engine assembly for use in propelling an aircraft.

FIG. 1 is a schematic view of an exemplary gas turbine engine (GTE) assembly 100 for use in propelling an aircraft. GTE assembly 100 includes a core engine 102 that includes a high pressure compressor 106, a combustor 108, and a high pressure turbine 110. GTE assembly 100 also includes a fan assembly 104 and a low pressure turbine 112. In operation, air flows through fan assembly 104 and compressed air is supplied from fan assembly 104 to high pressure compressor 106. The highly compressed air is delivered to combustor 108. Exhaust from combustor 108 drives rotating turbines 110 and 112 and exits GTE assembly 100 through an exhaust system 114.

GTE assembly 100 further includes a generally annular nacelle 116 that surrounds fan assembly 104 and is radially spaced outwardly from core engine 102. In the exemplary embodiment, a fuel accumulator system 120 is coupled to core engine 102 within nacelle 116 to allow for fuel vapor expansion without leakage of the fuel remaining within core engine 102 upon engine shutdown. In an alternative embodiment, accumulator system 120 may be coupled anywhere within nacelle 116 that allows it to function as described herein.

Figure 2:
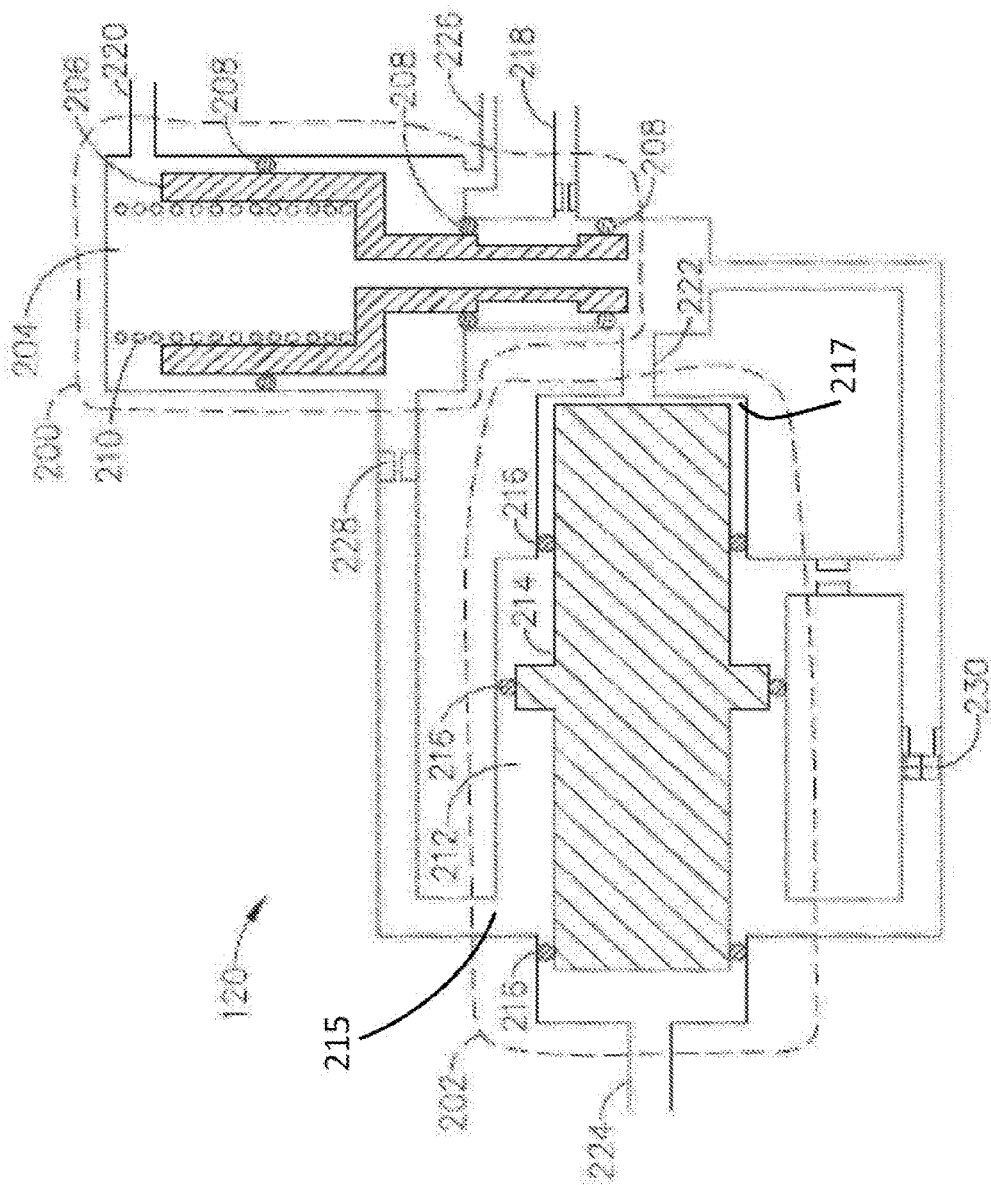
FIG. 2 is a schematic view of an exemplary accumulator system used in a gas turbine engine as shown in FIG. 1 at the start of engine shutdown.

FIG. 2 is a schematic view of accumulator system 120 as shown in FIG. 1 at a start of engine shutdown. Accumulator system 120 includes a control valve section 200 and an accumulator section 202. Control valve section 200 defines a control valve chamber 204 and includes a control valve 206 that is slideably coupled within control valve chamber 204 by one or more O-ring seals 208 and springs 210. Accumulator section 202 defines an accumulator chamber 212 and includes an accumulator piston 214. Accumulator piston 214 includes a high pressure side 215 fluidly coupled downstream from a high pressure passage 226 (discussed below), and a low pressure side 217 fluidly coupled downstream from a low pressure drain passage (discussed below).

Accumulator piston 214 is slideably coupled within accumulator chamber 212 by one or more O-ring seals 216.

Control valve section 200 is fluidly coupled to the engine's fuel system (not shown) by a fuel manifold passage 218 and a drain passage 220. Control valve section 200 is fluidly coupled to accumulator section 202 by an accumulator passage 222. When control valve 206 is in the closed position (shown in FIG. 2), fuel manifold passage 218 is closed off from accumulator passage 222. Control valve 206 is closed when fuel pressure entering high pressure passage 226 is greater than the force exerted in an opposite direction by spring 210 and low pressure drain passage 220. Spring 210 is forced into a retracted position while control valve 206 is closed. Alternatively, when control valve 206 is in a second, or open, position (shown in FIG. 3), the force from spring 210 and pressure at drain passage 220 overcomes pressure from high pressure passage 226, opening access to accumulator passage 222 by fuel manifold passage 218.

Accumulator section 202 is fluidly coupled to accumulator passage 222 and ambient air passage 224. Accumulator piston 214 may be in a first, or closed, position (shown in FIG. 2), which closes accumulator chamber 212 off from control valve chamber 204 when the pressure entering accumulator chamber 212 from ambient air passage 224 is greater than the pressure entering accumulator passage 222. Piston 214 may be in a second, or open, position (shown in FIG. 3), opening access between accumulator chamber 212 and control valve chamber 204 when the pressure from accumulator passage 222 overcomes the pressure from ambient air passage 224.

Figure 3:
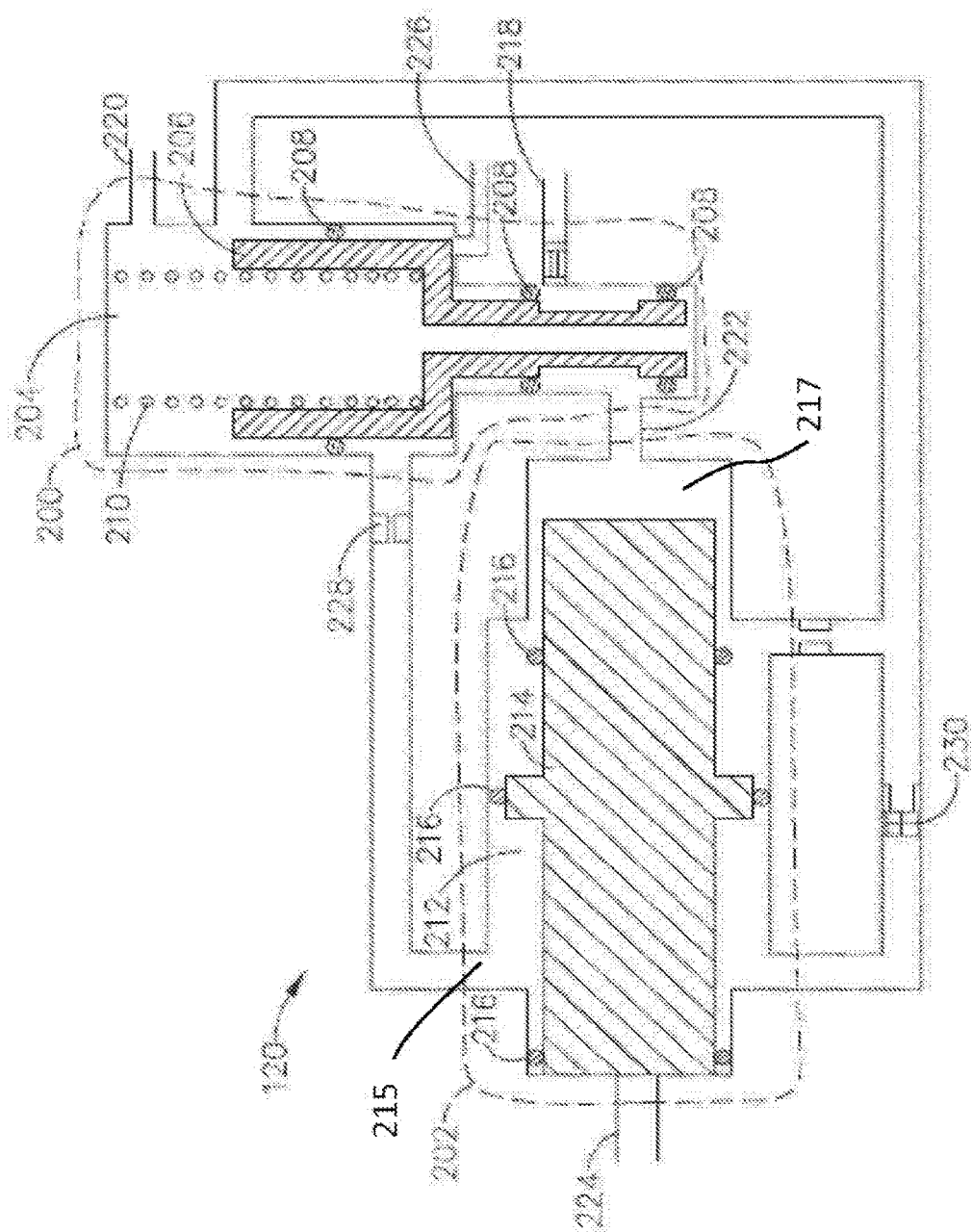
FIG. 3 is a schematic view of the exemplary accumulator system used in the gas turbine engine as shown in FIGS. 1 and 2 at engine startup.

In the exemplary embodiment, during engine operation, the main fuel pump pumps high pressure fuel through high pressure passage 226 to high pressure side 215 of accumulator chamber 212. As a result, there is low pressure in low pressure drain passage 220 and in low pressure side 217 of chamber 212. The high pressure created in high pressure passage 226 and high pressure side 215 forces control valve 206 and accumulator piston 214 to closed positions, as shown in FIG. 2. When the engine slows during shutdown, pressure in high pressure passage 226 and high pressure side 215 become equal to pressure in drain passage 220 and low pressure side 217. Control valve spring 210 forces control valve 206 into the shutdown position as shown in FIG. 3. For the rest of engine shutdown, and while the engine is off, fuel manifold passage 218 is open to accumulator passage 222. In accumulator chamber 212, pressure on high pressure side 215 is equal to pressure on low pressure side, causing accumulator piston 214 to move depending on pressure at accumulator passage 222 relative to ambient pressure in ambient passage 224.

As heat from the engine causes fuel remaining in the fuel manifold lines to heat up and expand, the opening of control valve 206 to fuel manifold passage 218 enables fuel expansion into accumulator system 120. The expanding fuel increases the pressure in accumulator passage 222 working against ambient pressure in ambient passage 224, moving accumulator piston 214 to the open position solely by exerting a force strong enough to overcome the minimal resistance between accumulator piston 214 and O-ring seals 216. Expansion of the fuel into accumulator system 120 prevents pressure build-up in the manifold and thus, leakage of fuel vapors out of the engine. After a period of time, the engine cools down and the fuel contracts, causing a reduction of pressure in accumulator passage 222, which causes accumulator piston 214 to move toward the closed position. The size requirements of accumulator system 120 are designed taking the length and rate of expansion for the particular engine into consideration.

FIG. 3 is a schematic view of accumulator system 120 within a gas turbine engine as shown in FIG. 1 at engine startup, and will be described using the same reference characters as in FIG. 2. In the exemplary embodiment, while the engine is off, accumulator piston 214 remains open and accumulator chamber 212 and accumulator passage 222 contain fuel from the fuel expansion. When the engine begins startup, the high pressure fuel from the main fuel pump rises rapidly in high pressure passage 226 and into high pressure side 215 of accumulator chamber 212. This rapid pressure increase forces control valve 206 to move to the closed position (shown in FIG. 2) and isolates fuel manifold passage 218 pressure from accumulator passage 222 pressure. In accumulator passage 222, the rise in the high pressure at high pressure side 215 forces accumulator piston 214, which is only restricted by the minimal O-ring seal 216 friction, to the closed position (shown in FIG. 2). As accumulator piston 214 closes, it forces the fuel in accumulator chamber 212 and accumulator passage 222 through drain passage 220 and back into the fuel system. The rapid fuel pressure increase is sufficiently large to minimize the amount of fuel that re-enters fuel manifold passage 218 before control valve 206 is completely closed off. This process occurs at very low engine startup speeds before fuel to the engine is even turned on. Thus, accumulator system 120 will have forced substantially all of the fuel that expanded into system 120 back into the fuel system before fuel is even introduced to the engine in the startup process. This enables accumulator system 120 to be completely isolated from the fuel manifold and operate independently from the engine.

Referring to FIGS. 2 and 3, in an alternative embodiment, accumulator system 120 may include a high pressure passage 226 and first and second orifices 228 and 230 for regulating a flow of cooling fluid, i.e. fuel, within accumulator system 120. High pressure from the engine's fuel pump may introduce a small amount of cooling fluid through high pressure passage 226 and into first orifice 228. The cooling fluid may then enter accumulator chamber 212 to cool accumulator piston 214, and then exit through second orifice 230. The cooling fluid may then flow back into control valve chamber 204 and get sent back into the fuel system through drain passage 220.

Figure 4:
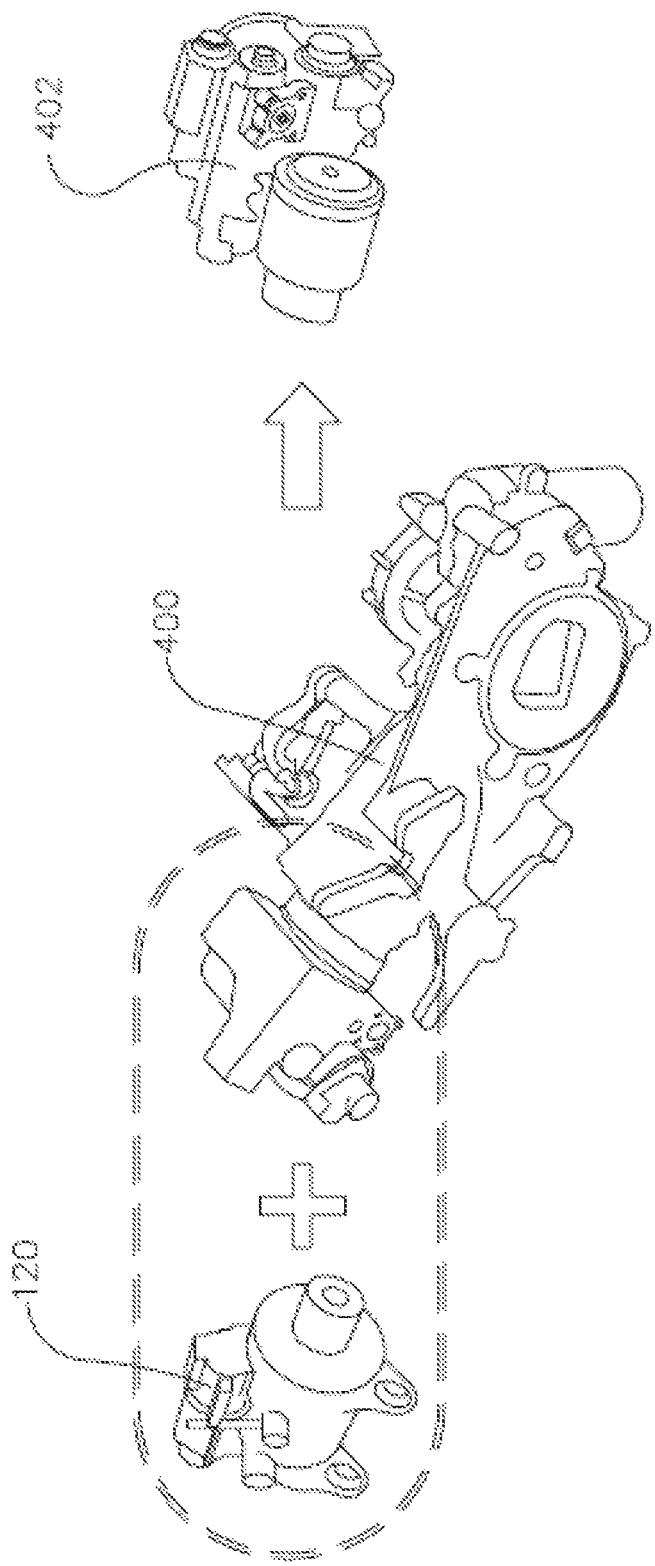
FIG. 4 is a schematic view of the accumulator system shown in FIGS. 1-3 coupled to a fuel split valve of a gas turbine engine to form an FSVA.

FIG. 4 is a schematic view of accumulator system 120 coupled to a fuel split valve of the gas turbine engine. In this embodiment, accumulator system 120 is coupled to a fuel split valve 400 to provide increased simplicity and size efficiency for incorporating accumulator system 120 into an aircraft engine. This combination is referred to as a fuel split valve plus accumulator, or FSVA, 402.

The accumulator system described herein enables fuel and fuel vapors in a gas turbine engine to expand to facilitate preventing fuel vapor leakage from the engine while it is cooling down. The accumulator described herein further enables providing an accumulator that is coupled to existing engine components to facilitate decreasing an overall size and weight of GTE assembly 100 and increasing engine efficiency by reducing fuel consumption of the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel accumulation system for a gas turbine engine comprising:
   a control valve section comprising a control valve slideably coupled within a control valve chamber, wherein the control valve section is fluidly coupled to a fuel manifold passage, wherein the control valve section controls expansion of a fluid flowing in the fuel manifold passage; and
   an accumulator valve section fluidly coupled to said control valve section via an accumulator passage, wherein the accumulator valve section comprises:
      an accumulator chamber to receive the fluid expanded in the fuel manifold passage via said control valve section and the accumulator passage; and
      an accumulator piston slideably movable within the accumulator chamber based on a pressure of the fluid entering the accumulator chamber from the fuel manifold passage via said control valve section and the accumulator passage relative to an ambient pressure from an ambient air passage in fluid communication with the accumulator piston when pressure at a high pressure side of the accumulator chamber is equal to or less than pressure at a low pressure side of the accumulator chamber, wherein when the control valve is in a first position the fluid is in fluid communication from the high pressure side of the accumulator chamber to the control valve chamber through the control valve.

2. A system in accordance with claim 1, wherein when said control valve is in the first position, said control valve prevents the fluid in the fuel manifold passage from expanding into said accumulator valve section.

3. A system in accordance with claim 2, wherein said control valve section is fluidly coupled to a high pressure passage from which high pressure fluid is provided to the high pressure side of the accumulator chamber when said control valve is biased to the first position by the fluid flowing in the high pressure passage, and further wherein the fluid is in fluid communication from the high pressure passage to the control valve chamber through the control valve.

4. A system in accordance with claim 2, wherein when said control valve is in a second position, said control valve enables the fluid in the fuel manifold passage to expand into said accumulator valve section.

5. A system in accordance with claim 4, wherein said control valve section further comprises a spring configured to bias said control valve toward the second position.

6. A system in accordance with claim 5, wherein said control valve section is fluidly coupled to the high pressure passage, said control valve is biased to the second position when a force exerted by said spring exceeds a force of the fluid flowing in the high pressure passage.

7. A system in accordance with claim 1, wherein said accumulator valve section is fluidly coupled to said control valve section by the accumulator passage at a first side and an ambient air passage at a second side, wherein the accumulator chamber receives the fluid expanded in the fuel manifold passage via said control valve section and said accumulator passage.

8. A system in accordance with claim 7, wherein said accumulator piston is in a first position when the ambient pressure of the fluid entering the accumulator chamber from the ambient air passage exceeds pressure of the fluid flowing into the accumulator chamber from the control valve section via the accumulator passage.

9. A system in accordance with claim 8, wherein said accumulator piston is in a second position when pressure of the fluid flowing into the accumulator chamber from the control valve section via the accumulator passage exceeds the ambient pressure of air entering the ambient air passage.

10. A system in accordance with claim 9, wherein when said accumulator piston is in the second position, the accumulator chamber is configured to receive the expanded fluid from the fuel manifold passage.

11. A system in accordance with claim 10, wherein when said accumulator piston returns to the first position, the expanded fluid flows from the accumulator chamber to a low pressure drain passage through the control valve of the control valve section.

12. A system in accordance with claim 1, wherein said system is coupled to a fuel split valve of the gas turbine engine.

13. A method of preventing fuel leakage in a gas turbine engine, said method comprising:
   controlling expansion of a fluid flowing in a fuel manifold passage using a control valve section fluidly coupled to the fuel manifold passage;
   receiving the fluid expanded in the fuel manifold passage via the control valve section at an accumulator valve section fluidly coupled to the control valve section via an accumulator passage, wherein said accumulator valve section defines an accumulator chamber and comprises an accumulator piston disposed within the accumulator chamber, wherein the accumulator piston is slideably coupled within the accumulator chamber by a seal; and
   slideably moving the accumulator piston based on a pressure of the fluid entering the accumulator chamber from the fuel manifold passage relative to an ambient pressure when pressure at a high pressure side of the accumulator chamber is equal to or less than pressure at a low pressure side of the accumulator chamber; and
   expanding fluid from the fuel manifold passage, wherein expanding the fluid from the fuel manifold passage moves the accumulator piston to an open position solely by exerting a force to overcome a minimal resistance between the accumulator piston and the seal.

14. A method in accordance with claim 13, wherein the control valve section includes a control valve and a spring slideably coupled within a control valve chamber, wherein controlling expansion of the fluid comprises preventing the fluid in the fuel manifold passage from expanding into the accumulator valve section when fluid pressure on the control valve from a high pressure passage exceeds a pressure exerted on the control valve by the spring.

15. A method in accordance with claim 14, wherein controlling expansion of the fluid comprises enabling the fluid in the fuel manifold passage to expand into the accumulator valve section when the pressure exerted on the control valve by the spring exceeds the fluid pressure on the control valve from the high pressure passage.

16. A method in accordance with claim 13, wherein receiving the fluid comprises receiving the fluid in the accumulator chamber when a pressure on a first side of the accumulator piston of the fluid flowing from the control valve section exceeds the ambient pressure on a second side of the accumulator piston from an ambient air passage.

17. A gas turbine engine comprising:
a fuel split valve; and
a fuel accumulation system coupled to said fuel split valve, said fuel accumulation system comprising:
a control valve section fluidly coupled to a fuel manifold passage, wherein the control valve section controls expansion of a fluid flowing in the fuel manifold passage, wherein said control valve section defines a control valve chamber and comprises a control valve slideably coupled within the control valve chamber; and
an accumulator valve section fluidly coupled to said control valve section via an accumulator passage, wherein the accumulator valve section comprises:
an accumulator chamber to receive the fluid expanded in the fuel manifold passage via said control valve section and the accumulator passage, wherein the accumulator chamber defines a high pressure side receiving pressure from a high pressure fuel passage during operation of the engine, and further wherein the accumulator chamber defines a low pressure side in fluid communication with the accumulator passage; and
an accumulator piston slideably coupled to the accumulation chamber by a seal, wherein the accumulator piston is slideably movable within the accumulator chamber based on a pressure of the fluid entering the accumulator chamber from the fuel manifold passage via said control valve section and the accumulator passage relative to an ambient pressure from an ambient air passage in fluid communication with the accumulator piston when pressure at the high pressure side of the accumulator chamber is equal to or less than pressure at the low pressure side of the accumulator chamber, wherein said accumulator valve section is fluidly coupled to said control valve section by the accumulator passage at the low pressure side and the ambient air passage at the high pressure side, and further wherein expanding fluid from the fuel manifold passage moves the accumulator piston to an open position solely by exerting a force to overcome a minimal resistance between the accumulator piston and the seal, and wherein the control valve provides fluid communication from the high pressure side of the accumulator piston to the control valve chamber and drain passage.

18. An engine in accordance with claim 17, wherein said control valve section further comprises a spring configured to bias said control valve toward a first position, said control valve is configured to enable fluid expansion into said accumulator valve section when a pressure exerted by said spring on said control valve exceeds a pressure on said control valve by the fluid from the high pressure passage.

* * * * *